United States Patent [19]
Garingarao et al.

[11] 3,880,981
[45] Apr. 29, 1975

[54] CYCLIC ACID LEACHING OF NICKEL BEARING OXIDE AND SILICATE ORES WITH SUBSEQUENT IRON REMOVAL FROM LEACH LIQUOR

[76] Inventors: Renato M. Garingarao, Block 15, Lot 56, SSS Village No. II, Marikina, Rizal; Michaelangelo A. Palad, 1332 Langit St., Sta. Cruz, Manila, both of Philippines

[22] Filed: Oct. 10, 1972

[21] Appl. No.: 295,911

[52] U.S. Cl. ............... 423/150; 423/140; 423/165
[51] Int. Cl. ...... B01d 11/00; B01f 1/00; C01g 1/00; C01g 49/00; C01g 57/00; C01g 53/00; C22b 3/00; C22g 23/00; C22b 61/00
[58] Field of Search .......... 75/101 R, 103, 108, 119, 75/115; 423/138, 140, 142, 150, 566, 594, 158, 166

[56] References Cited
UNITED STATES PATENTS

| | | | |
|---|---|---|---|
| 961,934 | 6/1910 | Carrick | 423/37 |
| 1,988,524 | 1/1935 | Stump | 423/166 |
| 2,647,828 | 8/1953 | McGauley | 75/103 |
| 2,721,796 | 10/1955 | McGauley | 75/103 |
| 2,722,480 | 11/1955 | Roy | 423/142 |
| 2,754,174 | 7/1956 | Roberts | 423/43 |
| 2,805,939 | 9/1957 | Schaufelberger | 75/108 |
| 2,872,306 | 2/1959 | Morrow | 75/101 |
| 2,899,300 | 8/1959 | Bailey | 75/101 |
| 3,082,080 | 3/1963 | Simons | 72/338 |
| 3,196,005 | 7/1965 | Moore | 423/142 |
| 3,716,618 | 2/1973 | Weir et al. | 423/143 |
| 3,793,430 | 2/1974 | Weston | 423/140 |

FOREIGN PATENTS OR APPLICATIONS

| | | | |
|---|---|---|---|
| 618,826 | 4/1961 | Canada | 75/119 |

OTHER PUBLICATIONS

Mellor, *Treatise on Inorganic & Theoretical Chemistry*, 1922, pg. 703.

*Primary Examiner*—O. R. Vertiz
*Assistant Examiner*—Eugene T. Wheelock
*Attorney, Agent, or Firm*—Hauke, Gifford, Patalidis & Dumont

[57] ABSTRACT

A hot solution of sulfuric acid and ammonium bisulfate is used to leach nickel and cobalt from finely ground, low grade nickel ores such as garnierite. Substantial quantities of iron and magnesium impurities pass into the leach liquor. The leach liquor is cyclically filtered, adjusted to its original acid content, and reused with a fresh batch of ore until the magnesium content is about 40–60 grams per liter. The resulting leach liquor is then slurried with an excess of oxidized ore to use up free acid and thereby precipitate a substantial proportion of the iron. Hydrogen sulfide is then added to the filtrate to separate out chromium, aluminum and copper. The resulting filtrate is treated with ammonium hydroxide to precipitate out the hydroxides of metal impurities including the residual iron. Nickel and cobalt salts are then precipitated with hydrogen sulfide and filtered out. Magnesium can be recovered as magnesium carbonate by treating the resulting filtrate with carbon dioxide. The final filtrate, containing essentially ammonium sulfate, is evaporated to dryness and heated to about 330°C. to form ammonia and ammonium bilsulfate. The ammonia is recycled to the nickel complexing step and the ammonium bilsulfate is recycled to the leaching liquor, together with sulfuric acid made from sulfur dioxide derived from the conversion of the nickel sulfide to nickel oxide.

9 Claims, 3 Drawing Figures

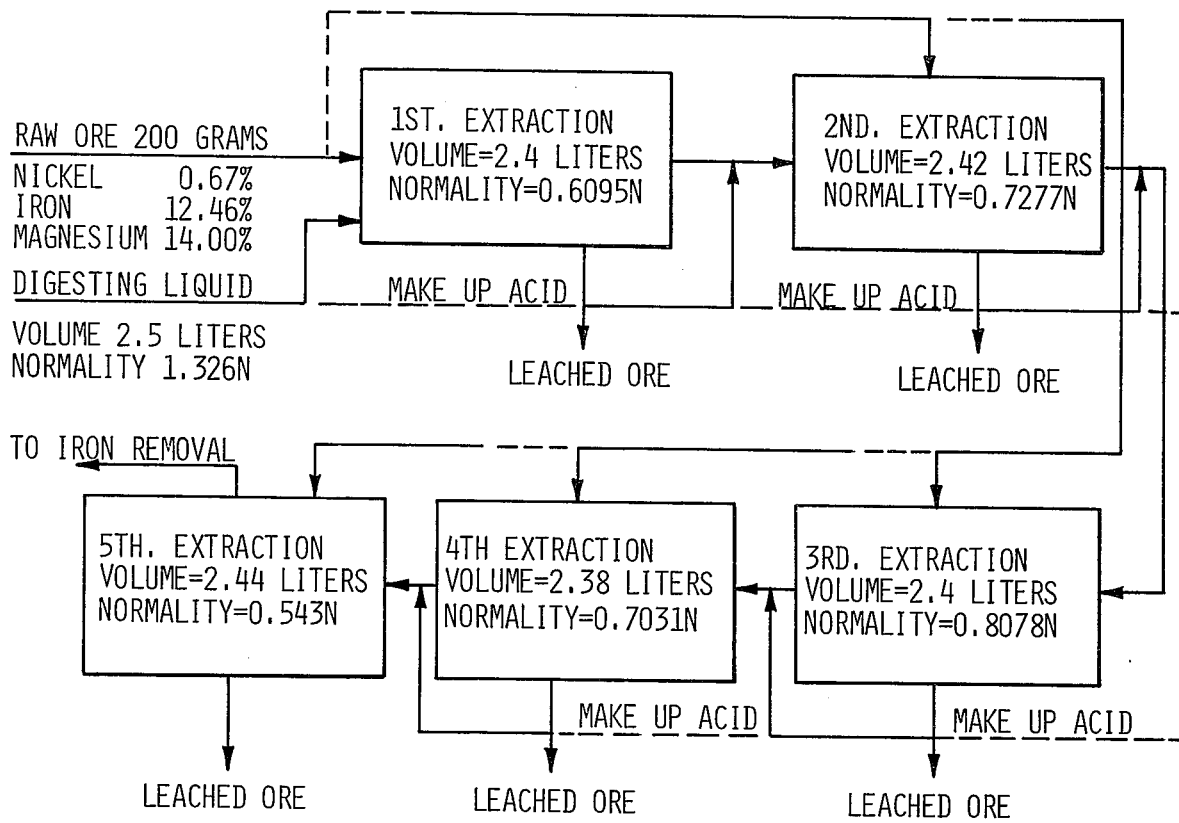
Fig-1
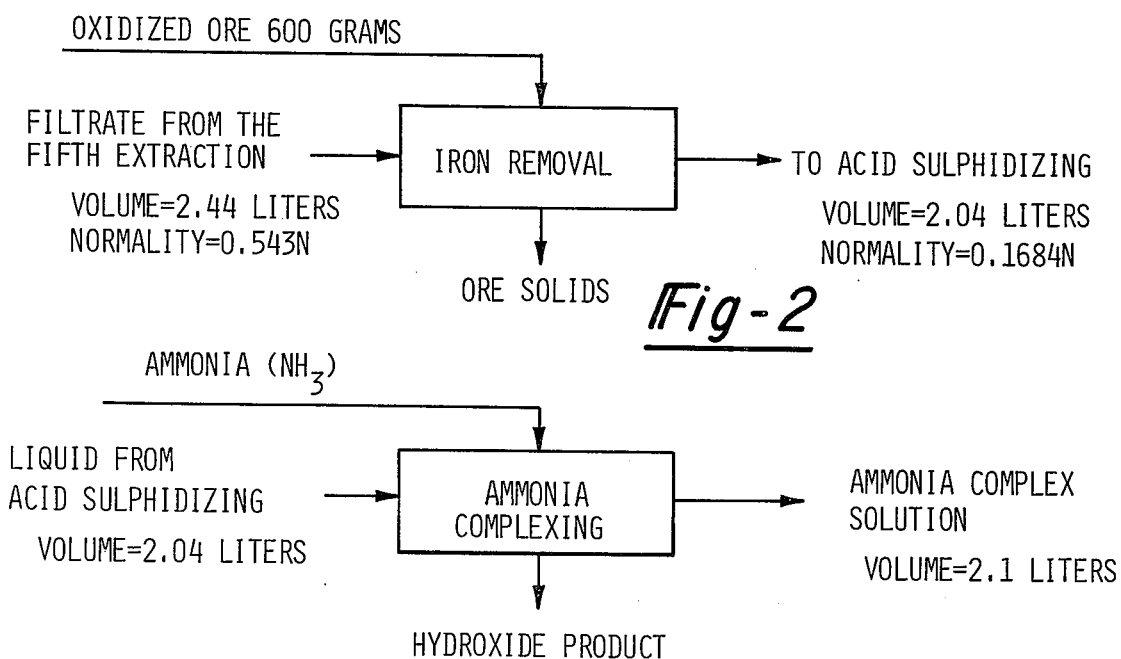
Fig-2
Fig-3

CYCLIC ACID LEACHING OF NICKEL BEARING OXIDE AND SILICATE ORES WITH SUBSEQUENT IRON REMOVAL FROM LEACH LIQUOR

BACKGROUND OF THE INVENTION

This invention relates to a hydrometallurgical process of recovering metal values, principally Ni and Co from low grade nickel bearing nickeliferous oxide and silicate (serpentine and garnierite) ores using $NH_4HSO_4$ and $H_2SO_4$ as the dissolving agent.

The nickel and cobalt values present in these ores are associated with other ore constituents in such manner that no known physical means of extraction is applicable.

Current practice, now commercially used, employs direct smelting or the pyro-metallurgical process. This process of separating nickel and cobalt values from the gangue is uneconomical when the nickel ores to be processed are relatively low in grade as furnaces of extraordinary large capacities would be required and fuel requirements would be considerable. This shortcoming is compounded when one would consider the fact that most nickel bearing ores as those of the nickeliferous oxide and silicate types are low in grade — usually about 1% nickel and around 0.1% cobalt, and even lower.

Some hydrometallurgical processes disclosed in prior arts utilize direct acid treatment. However, since there are no other means of upgrading the nickel prior to leaching, the whole bulk of low grade nickel bearing ores must be subjected to direct acid treatment. A large portion of this bulk of low grade nickel bearing ores consists of undesirable constituents which are also dissolved together with the nickel and cobalt values in the acid. The large volume of consumption of strong acid makes this uneconomical in commercial operations. A considerable amount of strong acid is left at the end of the leaching period which requires large amounts of alkaline reagent to neutralize the solution prior to actual separation of the desired constituents. Furthermore, in the case of sulfuric acid leaching, the presence of the problem of corrosion necessitates the use of special equipment in the operation.

High temperature and pressure requirements are also essential to bring about effective extraction of Ni and Co values as those disclosed in U.S. Pat. No. 2,721,796 or U.S. Pat. No. 3,082,080. With respect to high temperature and high pressure requirements, expensive equipment would be needed.

Existing pyro and hydrometallurgical processing operations involve critical and complicated operations and controls. They all require the application of high pressure and temperature and thus, entail large amounts of energy consumption.

From the preceding factors pointed out, it may be adjudged that only high grade nickel bearing ores can be economically treated through present pyro and hydrometallurgical processes.

It is the object of this invention to provide an effective and economical process or system for extracting Ni and Co from low grade, usually 0.5% Ni, nickel oxide and silicate ore types using ordinary atmospheric pressure and temperature not higher than 100°C.

Another object of this invention is to have a method of using acid as a leaching agent for these ores, such acid to have a low concentration so as not to present serious corrosion problems and recoverable in a form that can be recycled in the system to enhance the economy of the process.

One disadvantage in using acid leach in the treatment of nickel bearing oxide and silicate types of ores is that iron dissolves along with the desired metal values thereby contaminating the resultant liquor. Prior art disclosures concerned with the separation of Fe from the acid solutions (U.S. Pat. Nos. 2,805,939; 2,754,174; and 3,196,005) involve excessive dilution of the solution, require additional reagent(s) to oxidize ferrous ions to the ferric state, and require application of super-atmospheric pressure and high temperature.

It is therefore, a further object of this invention to devise a process by which most of the iron content of said solution is precipitated out without excessive dilution of the solution, without using any additional chemical reagent, and without the application of super-atmospheric pressure and temperature exceeding 100°C.

While this invention of acid leaching also dissolves the Mg in the ore and uses most of the acid consumed, a counterbalancing aspect is the fact that the methods we prefer to be used to separate the Ni and Co values obtained through our extraction process have provisions for the recovery of both the magnesium and the acid.

Other objects of this invention will be brought forth and become conspicuous during the course of the disclosure.

The type of ores we tried our process on and found amenable to were: Ni laterites whose composition varied from 0.8–1% Ni, 40–43% Fe and about 0.4% Mg; Low grade Ni laterites mixed with decomposed bedrock containing 0.29–1.97% Ni, 9–23% Fe and 2.9–18% Mg; Serpentine and Ni garnierite samples whose composition ranges from 0.3–4.0% Ni, 3.0–10.0% Fe and 8.0–20.0% Mg. All these ores contain less than 0.1% Co.

For clarity, we have subdivided our extraction and Fe separation processes into stages I and II, respectively. We have also outlined processes and operations we prefer to be used in separating the Ni and Co from solutions obtained through our extraction and iron separation processes. These preferred methods are explained under stages III, IV and V.

Figures, tables and examples are likewise presented as aids in the discussion. However, the data listed must not be construed as limitations of the process.

STAGE I — EXTRACTION

Our process proposes to extract Ni, Co (along with the Ni) and Mg values from the types of ores mentioned above with an acid digesting liquor. An aqueous solution of a mixture of $NH_4HSO_4$ and $H_2SO_4$ would be used as the dissolving agent but for the initial extraction stages, $H_2SO_4$ alone is employed. It will be apparent in the latter part of this disclosure that the $H_2SO_4$ can be recovered as an ammonium acid salt. This recovered $NH_4HSO_4$ is dissolved in $H_2O$ and used as the digesting liquor. Since the $H_2SO_4$ previously employed will not be 100% recovered, a make-up $H_2SO_4$ is added to the $NH_4HSO_4$. Hence, the digesting liquor will ultimately be a mixture of $NH_4HSO_4$ and $H_2SO_4$. The proportion of the acid and the acid salt is not definite and will be dictated by convenience and economy.

It is to be understood that digesting liquor when mentioned in this application means, either an aqueous solution of $H_2SO_4$ alone, of $NH_4HSO_4$ alone, or a mixture of both in any proportions, with or without dissolved metal sulfates.

The ore is first pulverized to minus 200 mesh, slurried and combined with digesting liquor in stoichiometrical proportions and preferably in an amount at least about 20% in excess of that required to react with the Mg and Fe contents of the ore. A most effective slurry is one with a pulp density of about 5–10% by weight and an acid strength of 1–1.7 N. A pulp density greater than 10% will result in greatly reduced Ni extraction. A higher normality will result in greater Mg and Fe being extracted with no appreciable increase in nickel solubility. This is not desired as it will increase the consumption of acid and unnecessarily contribute to the early saturation of the solution.

The ore digesting liquor slurry is heated to boiling under reflux and with constant agitation whereby the metal values are dissolved as metal sulfates. Taking Ni as the representative metal, the reaction will be as follows:

$$5\ NiO + 4H_2SO_4 + 2NH_4HSO_4 \rightarrow 5NiSO_4 + (NH_4)_2SO_4 + 5H_2O \qquad \text{Eq. I}$$

At our preferred pulp density of 5–10% by weight and acid strength of 1–1.7 N, 1–4 hours of heating time is necessary to dissolve 80–90% of the ore's Ni content. This will extract a corresponding 15–30% of the Fe content of the ore, and 65–75% of the magnesium content (Table I).

The leached ore is then separated from the liquor by filtration and the filtrate's acid content determined by titration. The acid consumed is then replaced with $NH_4HSO_4$ and $H_2SO_4$, the volume of the liquor readjusted to its original volume, and recycled to treat a fresh batch of ore as before. The capacity of the recycled digesting liquor to further dissolve metal values depends on its degree of saturation with the metal sulfates it is taking up into solution. Nickel extraction efficiency of the second, third and succeeding extractions does not drop and vary sharply from that of the first extraction provided the Mg concentration of the liquor has not yet reached 40 gms./liter.

We found out that Ni extraction efficiency decreases to about 50% and below when the Mg and Fe concentration reaches 40 and 10 grams per liter, respectively. However, a Mg concentration of 40–60 gms./l with Fe concentration less than 5 gms./l will still result in high Ni extraction efficiency.

Obviously, the number of times that the metal rich liquor can be recycled during the extraction stage is determined and limited by the ores magnesium content. As shown in FIG. 1 and Table 1, the digesting liquor for an ore with 14% Mg can be recycled five times before it reaches the limiting Mg concentration of 40 gms. per liter, where it is then treated to remove most of its Fe content at stage II.

STAGE II — Fe SEPARATION

An excess of oxidized ore is slurried with the saturated digesting liquor from stage I to make a pulp density of about 15–30% by weight, and heated to boiling under reflux with stirring for 30 minutes to 1 hour. Under these conditions, 70–85% of the Fe in solution is precipitated out. From the accompanying example, Table II, Ni to Fe ratio can be reduced from 1:5 before Fe separation, to 1.0:0.8 after most of the Fe is precipitated out.

Along with the precipitation of Fe, there is a corresponding loss of sulfur from the solution. However, 10–20% of the Ni in the ore and about 10–15% of the Mg content is still extracted. The mechanism of the reactions may be explained as follows.

It is generally known that neutral solutions of Ferrous and Ferric ions when diluted with $H_2O$ several times its volume and heated will precipitate out the Ferric ions as $Fe_2O_3$.

$$Fe_2(SO_4)_3 + 3H_2O \rightarrow Fe_2O_3 + 3H_2SO_4 \qquad \text{Eq. II}$$

If the $Fe_2O_3$ is not separated immediately, there is a tendency for the following reaction to take place.

$$Fe_2O_3 \cdot + H_2O + H_2SO_4 \rightarrow Fe_2(OH)_4 \cdot SO_4 \qquad \text{Eq. III}$$

In our process, we observed that the amount of Fe present as Ferric in the saturated liquor is about 70–80% of the total Fe content. Apparently, reacting the liquor with excess oxidized ore will use up the remaining free acid of the liquor rendering the solution neutral

EXTRACTION STAGE

TABLE 1

| Element | First extraction | | | Second extraction | | | Third extraction | | | Fourth extraction | | | Fifth extraction | | | Overall recovery | |
|---|---|---|---|---|---|---|---|---|---|---|---|---|---|---|---|---|---|
| | GPL | Extracted GMS | Percent | GPL | Extracted GMS | Percent | GPL | Extracted GMS | Percent | GPL | Extracted GMS | Percent | GPL | Extracted GMS | Percent | Extracted GMS | Percent |
| Nickel | 0.4802 | 1.1524 | 86.0 | 0.9385 | 1.1188 | 83.5 | 1.4163 | 1.1270 | 84.17 | 1.8844 | 1.0857 | 81.02 | 2.3008 | 1.1290 | 84.26 | 5.614 | 83.79 |
| Iron | 2.3196 | 5.567 | 22.34 | 4.1540 | 4.4857 | 18 | 7.9175 | 8.9493 | 35.9 | 9.8602 | 4.4653 | 17.02 | 11.9668 | 5.7316 | 23 | 29.1989 | 23.43 |
| Magnesium | 8.54 | 20.496 | 73.20 | 16.2838 | 18.9108 | 67.54 | 24.5833 | 19.5931 | 69.97 | 32.4454 | 18.22 | 67.07 | 39.7721 | 19.824 | 70.8 | 97.044 | 69.31 | and precipitating the Ferric ions as $Fe_2O_3$ or more probably as $Fe_2(OH)_4 \cdot SO_4$.

The slurry is filtered and the solids set aside to treat another batch of saturated liquor from the extraction stage.

$H_2S$ gas is passed to the filtrate to precipitate out the metals of the acid $H_2S$ group such as Cr, Al and Cu, and to coagulate and precipitate out ore fines. It is then filtered to separate the solids and the filtrate is now ready for the separation of Ni (and Co) in the next stage.

STAGE III — AMMONIA COMPLEXING

It is an established fact that Ni and Co form amine complexes with Ammonia. A solution containing Ni, Co, Fe, and Mg when treated with excess ammonia will precipitate the hydroxides of Fe and Mg while Ni and Co will remain in solution as the amine complexes and can thus be separated by filtration.

A strong objection in the use of this method for Ni and Co separation is that the Fe and Mg hydroxides formed are bulky and gelatinous and much Ni and Co are co-precipitated with them. A bulky and gelatinous precipitate also presents difficult and costly filtration problems.

The filtrate obtained from stage II will not be confronted with these problems. Aside from the metal values, this liquor contains $(NH4)_2SO_4$ (Eq. 1) and because of common ion effect, the addition of $NH_4OH$ to this solution will not cause the precipitation of $Mg(OH)_2$. In practice, however, a negligible part of the Mg in the solution is precipitated.

The Fe in the solution will not pose any problem as it is now present in an amount that will not be bulky when it is precipitated as Iron hydroxide. In the example given in FIG. I, the Ni to Fe ratio of the ore from which the solution came from is 1.0:18.6. It is conceivable that for an ore with a higher Ni value, the Ni to Fe ratio of the solution will be much greater.

In our example, the nickel ammonia complex and metal hydroxide precipitate was obtained in the following manner.

Concentrated NH4OH was added while stirring, to the solution obtained in stage II until the solution turned to a very distinct blue (pH>9) color indicating the formation of the Ni ammonia complex. The metal hydroxides formed were separated by filtration, the cake being washed several times with dilute $NH_4OH$, combining the washing with the filtrate.

An analysis of the resulting filtrate and precipitate hydroxides (FIG. 3, Table III) showed that only 2% of the Ni in solution is co-precipitated. The analysis gave out 6.1564 gm. Ni in the resulting filtrate and 0.0912 gm. Ni in the precipitate indicating a Ni accountability of 98.74%.

STAGE IV — SULPHIDIZING

The solution from stage III consists now primarily of Ni, Co, Mg, $(NH_4)_2 SO_4$ and traces of Fe and other metal values.

Ni and Co are precipitated as sulfides when $H_2S$ gas is reacted to a solution of their ammonia complexes. This method is very effective in treating the solution obtained from stage III, Ni being almost 100% precipitated. This is valid even if concentration of Ni in the solution is very low.

To illustrate the efficiency of this method when applied to separate Ni and Co from such solutions, $H_2S$ gas is passed to a Ni and Co amine complex solution containing less than 1.0 gm/l of nickel. This solution was obtained by the methods previously described. Its composition was:

| | | | | |
|---|---|---|---|---|
| Ni | = | 0.7189 gm/l | = | 1.7254 gms. |
| Fe | = | 0.8660 gm/l | = | 2.0784 gms. |
| Mg | = | 29.0089 gm/l | = | 69.6214 gms. |

$H_2S$ gas was produced by reacting dilute HCl with pyrite, and passed to the solution. When this solution darkened, the passage of $H_2S$ was stopped and the solution heated to boiling to expel excess hydrogen sulfide gas and to coagulate the precipitate. The solution was filtered and the precipitate carefully collected and dried. The sulfide product weighed 5.6 grams and assayed, as follows:

| | | | | |
|---|---|---|---|---|
| Ni | = | 30.19 % | = | 1.6908 gms. |
| Fe | = | 0.46 % | = | 0.026 gms. |
| Co | = | 0.846% | = | 0.047 gms. |
| S | = | 38.8 % | = | 2.1728 gms. |

It can be seen that 97.9% of the Ni present as amine complex was converted to sulfide.

The laboratory method of reacting $H_2S$ gas to the Ni complex solution did not provide for the measurement of gas passing to the higher percentage of Ni. The evolved $SO_2$ gas can be converted into sulfuric acid which in turn, can be utilized during the extraction stage.

One such sulfide concentrate that assayed 34.5% Ni was ignited at 500°C. After ignition, the percentage of Ni rose to 78%. Pure NiO has a nickel content of 78.57%.

STAGE V — MAGNESIUM AND REAGENT RECOVERY

The solution from stage IV now stripped of Ni and Co consists primarily of Mg, $(NH_4)_2 SO_4$ and traces of unprecipitated metal compounds. Such solution when made to react with $NH_4OH$ and carbon dioxide will precipitate Mg as $MgCO_3$.

$$MgSO_4 + 2NH_4OH + CO_2 \rightarrow MgCO_3 + (NH4)_2SO_4 + H_2O \qquad \text{Eq.IV}$$

It is said that 95.7% of the Mg in solution (U.S. Pat. No. 3,338,667) is precipitated down by this method. The $MgCO_3$ formed when ignited will form MgO and $CO_2$.

$$MgCO_3 \rightarrow MgO + CO_2 \qquad \text{Eq. V}$$

The $CO_2$ formed in this reaction will be recycled back to the preceeding step (Eq. IV) in the formation of $MgCO_3$.

TABLE - 2

| ELEMENT | BEFORE IRON REMOVAL | | AFTER IRON REMOVAL | | | LOSS | |
|---|---|---|---|---|---|---|---|
| | GPL | GMS | GPL | GMS | GMS Extracted | GMS | % |
| NICKEL | 2.3008 | 5.614 | 3.1014 | 6.3268 | 0.7128 | | |
| FERROUS | 3.2839 | 8.0127 | 1.6086 | 3.2815 | | | |
| FERRIC | 8.6828 | 21.1860 | 1.1144 | 2.2734 | | | |
| TOTAL IRON | 11.9668 | 29.1989 | 2.7230 | 5.555 | | 23.6439 | 80.97 |
| MAGNESIUM | 39.7721 | 97.044 | 54.6529 | 111.4920 | 14.448 | | |
| SULFUR | 114.1354 | 278.4904 | 120.4061 | | | 32.8619 | 11.8 |
| NICKEL TO IRON RATIO | 1:5.2 | | 1:0.87 | | | | |

TABLE - 3

| ELEMENT | LIQUOR FEED | | PRODUCT LIQUOR | | HYDROXIDE PRODUCT | |
|---|---|---|---|---|---|---|
| | GPL | GMS | GPL | GMS | GMS | % |
| NICKEL | 3.1014 | 6.3268 | 2.9316 | 6.1564 | 0.0912 | 0.48 |
| IRON | 2.7230 | 5.5549 | 0.0721 | 0.1514 | 5.4226 | 28.54 |
| MAGNESIUM | 54.6529 | 111.4919 | 49.8553 | 104.6961 | 1.4763 | 7.77 | solution. As a result, sulfur present in the resulting NiS is in excess, thereby, lowering the percentage of Ni in the sulfide product. Careful control of $H_2S$ gas enabled us to obtain Ni concentrates analyzing higher than 40% Ni, from solutions coming from stage III.

Nickel sulfide when heated from 400°–550°C will be converted into nickel oxide and sulfur dioxide. This step when incorporated in the overall process will result in the conversion of the sulfide concentrate of Ni into an acid soluble nickel oxide concentrate with a The solution, after precipitation of its Mg content is now essentially an aqueous solution of $(NH_4)_2SO_4$. The salt can be recovered by careful evaporation to prevent decomposition. The recovered $(NH_4)_2SO_4$ when thermally cracked at 330°C will form ammonia gas and ammonium bisulfate.

$$(NH_4)_2SO_4 \,_{330}\rightarrow \,^\circ CNH_3 + NH_4HSO_4 \qquad \text{Eq. VI}$$

The resultant ammonia gas will be used in the Ni complexing stage and in the formation of $MgCO_3$ (Eq.

IV), while the $NH_4HSO_4$ together with the $H_2SO_4$ acid produced from the $SO_2$ gas evolved from the conversion of NiS concentrate to the oxide form, is recycled to the extraction stage.

It is clear that this stage, when employed together with our extraction process, will supply the reagent requirements of the whole operating process. The recovered and recycled reagents will only need minimal make-up to compensate for normal losses.

We can conclude, therefore, that the total cost of the different reagents utilized in this process will comprise reagent recovery costs and production cost or purchase price of make-up reagents.

What we claim to be new are:

1. In a method wherein particles of a nickeliferrous oxide and silicate type of ore containing nickel, cobalt, iron, magnesium and other metal values are leached with an aqueous solution of an acid leaching agent selected from the group consisting of sulfuric acid, ammonium bisulfate and mixtures thereof at an elevated temperature, and wherein iron is separated from the leach liquor, the improvement which comprises:
   a. carrying out said leaching at ambient pressure and at a temperature below about 100°C;
   b. periodically separating the leached ore from the leach liquor and using said separated leach liquor to leach additional batches of said ore prior to the separation of iron therefrom;
   c. periodically adding make-up acid to said leach liquor to replace the acid used up in said leaching;
   d. contacting the final hot leach liquor with an excess of said ore to effect an increase in pH and to effect the precipitation of an insoluble iron compound therefrom;
   e. then separating the resulting insoluble iron compound and insoluble ore from said leach liquor; and
   f. then recovering metal values from the resulting liquor.

2. The method of claim 1 wherein said leaching of successive batches of ore is discontinued when the percentage of nickel extracted from a batch of said ore decreases to less than 50 percent of the nickel content of said ore.

3. The method of claim 1 wherein said leaching is discontinued when the concentration of magnesium reaches about 60 grams per liter in a liquor where the concentration of iron is less than about 5 grams per liter.

4. The method of claim 1 wherein said leaching is discontinued when the concentration of magnesium reaches about 40 grams per liter in a liquor wherein the concentration of iron is at least about 10 grams per liter.

5. The method of claim 1 wherein said acid comprises an aqueous solution of ammonium bisulfate and sulfuric acid.

6. The method of claim 1 wherein said temperature is the boiling temperature of the leach liquor and wherein said heating is carried out with reflux.

7. The method of claim 1 wherein said particles are slurried to a pulp density of about 5–10 percent by weight in leach liquor having an acid strength of about 1–1.7N.

8. the method of claim 1 wherein said mixture of excess ore and liquor has a pulp density of about 15–30 percent by weight and said contacting step is carried out at about the boiling temperature of the liquor at ambient pressure for a period of about ½ – 1 hour.

9. The method of claim 1 wherein:
   a. the filtrate resulting from said iron separation is treated with hydrogen sulfide and insoluble solids are separated therefrom;
   b. then adding ammonium hydroxide to the resulting filtrate to effect the precipitation of substantially all the iron therein as a hydroxide and separating said hydroxide from said filtrate;
   c. then passing hydrogen sulfide through the resulting fltrate to effect the precipitation of nickel from said filtrate as nickel sulphide and separating said nickel sulfide from said filtrate;
   d. then adding carbon dioxide to said filtrate to effect the precipitation of magnesium as magnesium carbonate and separating the latter from said filtrate;
   e. then drying said filtrate and thermally decomposing the resulting solids to effect the recovery of ammonium bisulfate and ammonia from said filtrate;
   f. effecting the recovery of carbon dioxide by the thermal decomposition of said separated magnesium carbonate; and
   g. recycling said ammonium bisulfate, ammonia, and carbon dioxide.

* * * * *